United States Patent [19]

Bright et al.

[11] Patent Number: 4,835,194

[45] Date of Patent: May 30, 1989

[54] FILM-FORMING COMPOSITIONS AND FOG RESISTANT FILM PRODUCED THEREFROM

[75] Inventors: Paul F. Bright, Reading, England; Herbert F. Leder, Richterswil, Switzerland

[73] Assignee: The Dow Chemical Company, Midland, Mich.

[21] Appl. No.: 76,511

[22] Filed: Jul. 22, 1987

[30] Foreign Application Priority Data

Jul. 23, 1987 [CH] Switzerland ................. 02951/86

[51] Int. Cl.⁴ .............................................. C08K 5/06
[52] U.S. Cl. .................................. 523/169; 524/375; 524/585
[58] Field of Search ............... 524/375, 535; 523/169

[56] References Cited

U.S. PATENT DOCUMENTS

| | | | |
|---|---|---|---|
| 2,519,013 | 8/1950 | Banigan | 524/375 |
| 3,392,133 | 7/1968 | Stickelmeyer | 524/375 |
| 3,541,040 | 11/1970 | Eastes | 523/169 |
| 3,778,391 | 12/1973 | Morris | 524/375 |
| 3,843,583 | 10/1974 | Gibbs | 524/375 |
| 4,148,770 | 4/1970 | Stahle et al. | 524/375 |
| 4,486,552 | 12/1984 | Niemann | 524/375 |
| 4,490,323 | 12/1984 | Thompson | 524/585 |

FOREIGN PATENT DOCUMENTS 0731728  6/1955  United Kingdom ................ 524/375

*Primary Examiner*—Joseph L. Schofer
*Assistant Examiner*—Peter Mulcahy
*Attorney, Agent, or Firm*—Beatrice E. Goldener; Walter J. Lee

[57] ABSTRACT

The film-forming composition comprises a mixture of a linear low density polyethylene and an antifogging agent. The antifogging agent comprises a compound of formula I. The composition is useful for preparing films with antifogging properties.

13 Claims, No Drawings

FILM-FORMING COMPOSITIONS AND FOG RESISTANT FILM PRODUCED THEREFROM

The present invention relates to novel film-forming compositions comprising an ethylene polymer and antifogging agent, a process for preparing these film-forming compositions and to fog resistant films produced therefrom.

Polyethylene films are characterised by high resistance to moisture vapour transmission. This property is of particular advantage in the packaging of moist food with these films because the moisture contents of the food is substantially retained over long periods of time. Another desirable property of polyethylene films is their transparency enabling the visual identification of food products packaged in such films. However, often sufficient water evaporates from moist food, such as meat or vegetables, to produce condensation on the film. This condensation is especially troublesome when the interior of the package contains enough moisture to produce fogging of the interior surface of the film thereby interfering with the visual identification of the packed goods.

Therefore, great effort has been made of those skilled in the art to find additives for preventing the fogging of polyethylene films.

A great number of antifogging agents have been suggested as additives to polyvinyl chloride, for example various types of polyoxy compounds have been disclosed in U.S. Pat. No. 4,072,790. However, it is well known in the art that many compounds which are used as antifogging agents in polyvinyl chloride compositions do not provide ethylene polymer compositions with sufficient antifogging properties, see for example the comparative examples in U.S. Pat. No. 4,486,552.

In U.S. Pat. No. 3,391,129 it has been suggested to add a compound of formula II

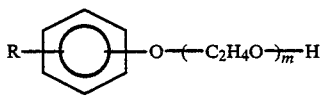

(II)

wherein R is an alkyl radical, preferably containing 8 carbon atoms and m is an integer of at least 8 and preferably from about 12 to about 13, to an ethylene/vinyl acetate copolymer. Further additives to polyethylene compositions are known from European Plastic News, May 1983, antifog film for agricultural applications by Dr. G. Bogniola, Atlas Chemical Industry. Trials made by the applicant have shown that some of these additives do not give sufficient antifogging performance for food packaging applications.

Accordingly, it would still be desirable to provide new film-forming compositions of which films with good antifogging properties can be produced.

Accordingly one aspect of the present invention is a film-forming composition comprising a mixture of
 (A) an ethylene polymer and
 (B) an antifogging agent
which is characterized in that the antifogging agent comprises a compound of formula I

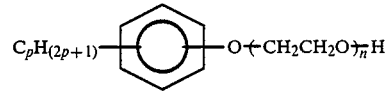

(I)

wherein n is an average number of 3 to 8 and p is 9 or 10 and the ethylene polymer is a linear low density polyethylene produced by polymerization of ethylene with up to 25 percent by weight of the polymer of at least one alpha,beta-ethylenically unsaturated alkene having from 3 to 12 carbon atoms per alkene molecule.

A further aspect of the present invention is a process for preparing this film-forming composition by blending the above-mentioned linear low density polyethylene and the above-mentioned antifogging agent.

The film-forming composition of the present invention is useful for producing a film which is highly resistant to fogging.

Accordingly, a further aspect of the invention is a film produced of the above-mentioned film-forming composition.

The film of the present invention is very useful for wrapping non-food items and, particularly, food such as meat, bakery items, vegetables or fruits.

From DE-A-2007219 it is known to produce heat-shrinkable polyolefin films by plastifying a polyolefin composition containing an alkyl phenoxy polyethoxy ethanol as an antifogging agent, extruding a film, subjecting the film to a radiation treatment, stretching the film and subjecting it to a corona treatment. Examples 1 and 2 of De-A-2007219 disclose mixtures comprises mainly an ethylene/vinyl acetate copolymer and a nonyl phenoxy poly(ethyleneoxy) ethanol with about 4 ethyleneoxy units. Although the films produced from these mixtures have been subjected to a radiation treatment which causes an increase of the surface tension of the film and accordingly a decrease in fogging at the film surface, the anti-fogging properties of the film are not sufficient unless the film is subjected to a corona treatment. Table II of DE-A-2007219 illustrates the addition of various alkyl phenoxy poly(ethyleneoxy) ethanols with 4 to 12 ethyleneoxy units to an ethylene/vinyl acetate copolymer. Unless the films produced therefrom have been subjected to a corona treatment the anti-fogging properties are for all samples "from average to bad" although the films have been subject to a radiation treatment.

Table V of DE-A-2007219 illustrates the addition of a nonyl phenoxy poly(ethyleneoxy) ethanol with about 4 ethyleneoxy units to two types of ethylene/vinyl acetate copolymers, to a polyethylene homopolymer and to an ethylene/acrylic acid copolymer. All films produced therefrom have been subjected to a radiation treatment which causes an increase of the surface tension and accordingly a decrease in fogging at the film surface. If the films have not been subjected to a corona treatment and have not been heat-shrunk, the ethylene/vinyl acetate copolymer films and the polyethylene homopolymer film are clear after the antifogging test of Example 4, however, the ethylene/acrylic acid copolymer film shows fogging. These results demonstrate that it is not predictable whether a selected anti-fogging agent is useful for a selected type of ethylene polymer or not.

Accordingly, it is indeed surprising that a compound of formula I is useful for providing antifogging properties to films produced of a linear low density polyethylene even if the film has not been subjected to a radiation treatment and that a compound of formula I wherein n is the average number of 3 to 8, preferably of 4 to 6, provides much better anti-fogging properties than a comparable compound of formula I wherein n is the average number of 2 or less or of 12 or more.

By "linear low density polyethylene" (LLDPE) is meant normally solid ethlene polymers suitable for extrusion, casting, moulding or similar fabrication produced by polymerization of ethylene with up to 25 percent by weight of the polymer of at least one alpha,-beta-ethylenically unsaturated alkene having from 3 to 12 carbon atoms per alkene molecule.

Preferred linear low density polyethylenes are those wherein ethylene has been polymerized with at least one alpha,beta-ethylenically unsaturated alkene having from 4 to 8 carbon atoms per alkene molecule.

The LLDPE copolymer preferably used in the present invention are those which are for example prepared using coordination catalyts, e.g., the well known Ziegler, Natta or Phillips catalysts. This includes those made at low, intermediate or high pressures. These ethylene polymers contain up to 25 percent, preferably from 5 to 20 percent, more preferably from 5 to 10 percent, by weight of at least one alpha-olefin comonomer which is preferably selected from the group consisting of propylene, 1-butene, 1-isobutene, 4-methyl-1-pentene, 1-pentene, 1-isopentene, 1-hexene, 1-isohexene, 1-heptene, 1-isoheptene, 1-ocetene, 1-isoocetene, 1-nonene, 1-isononene, 1-decene and 1-isodecene. 1-Hexene, 4-methyl-1-pentene, 1-butene, propylene and in particular 1-octene are the most preferred comonomers. The amount of comonomers used should generally be enough to result in polymer densities in the low range of 0.89 to 0.94 g/ccm. The copolymers generally have a high molecular weight and have a melt index (melt flow) in the range of about 0.1 to about 30 dg/min. as measured by ASTM-D-1238 condition (E). These LLDPE polymers are recognized in the art as having excellent strength, resistance to tear propagation and exhibit good resistance to tearing or puncturing. This performance of the LLDPE polymers is especially important in food packaging applications and most especially in packaging of meat.

By "linear low density polyethylene" are also meant terpolymers of ethylene, an alpha-olefin having 3 or 4 carbon atoms and an alpha-olefin having 5 to 12 carbon atoms per molecule which terpolymers are disclosed in EP-A-010428 the teaching of which is enclosed herewith by reference. The alpha-olefin with 3 or 4 carbon atoms to be terpolymerized with ethylene is propylene or butene-1. Examples of the alpha-olefin with 5 to 12 carbon atoms include 1-pentene, 1-hexene, 4-methyl-1-pentene, 3-methyl-1-pentene, 1-heptene, 1-octene, 1-decene and 1-dodecene of which 1-octene is preferred. The terpolymer is preferably produced of 90 to 99.5 mol %, more preferably 92 to 99 mol %, of ethylene, 0.2 to 9.8 mol %, more preferably 0.3 to 7 mol %, of the alpha-olefin having 3 or 4 carbon atoms, and 0.2 to 9.8 mol %, more preferably 0.3 to 7 mol%, of the alpha-olefin having 5 to 12 carbon atoms.

The active ingredient in the antifogging agent useful in the practise of the present invention is represented by formula I above. The nonyl or decyl group and the polyethoxyethanol group in formula I are preferably in the para-position. On the average, n is from 3, preferably from 4, up to 8, preferably up to 7 and more preferably up to 6. Most preferably, n is on the average about 5. Preferably, p is 9.

The film-forming composition of the present invention preferably contains from 0.1, more preferably from 0.4 and preferably up to 1.0, more preferably up to 0.8 percent of the compound of formula I, based on the total ethylene polymer weight. A mixture of different above-mentioned compounds of formula I is also useful, however, the total weight of the mixture is preferably in the stated range.

Mixtures of an ethylene polymer and an antifogging agent containing high amounts, for example 6 weight percent or more, of the compound of formula I may be used in cmbination with ethylene polymers containing no antifogging agent to produce the film-forming compositions having the optimum concentrations of the compound of formula I.

The mixing of the antifogging agents into the ethylene polymer may be done by dry-blending or by mixing it into molten polymer by commonly used techniques such as tumble blending, roll-milling, mixing in a Banbury-type mixer or mixing in an extruder barrel.

Other additives, for example colourants, slip agents, anti-oxidants or fillers may also be added to the film-forming composition of the present invention. The antifogging agents may also be preblended with the optional additives and the blend then added to the polymer. For easier batch-to-batch control of quality, it may be preferred to employ concentrated masterbatches of olefin polymer/antifogging agent blends which are subsequently blended, as portions, to additional quantities (normally the main portion) of ethylene polymer to achieve the final desired formulation. The olefin polymer in the masterbatch can be the same as or different from the ethylene polymer to which the masterbatch is added. Such polyolefins can be used in any amount as long as they do not significantly influence the desired properties of the film-forming composition of the present invention.

The masterbatch or the neat additives may be injected into freshly prepared ethylene polymer while the ethylene polymer is still molten and after it leaves the polymerisation vessel or train.

The film-forming compositions of the present invention can be fabricated to films according to well-known processes of making films of ethylene polymers, for example cast films and blown films. The film-forming compositions of the present invention are also suitable in coextrusion of multilayered films. The films of the present invention are preferably not cross-linked and have preferably not been subjected to a radiation treatment.

The following examples illustrate the invention and should not be considered as limiting its scope. All parts are by weight unless otherwise indicated. Melt indexes are determined according to ASTM D-1238, condition E.

EXAMPLES 1 AND 2 AND COMPARATIVE EXAMPLES A AND B

The following compounds of formula I above are used in these examples as antifogging agents:
Example 1: average number n=5
Example 2: average number n=7.5
Comp. example A: average number n=2
Comp. example B: average number n=12
The compounds of formula I are in all cases para-substituted and p is in all cases 9.

6 percent of the antifogging agent, based in the weight of an ethylene/1-octene copolymer are mixed with an ethylene/1-octene copolymer using a Buss Ko-Kneader. The ethylene/1-octene copolymer contains nominally 6 to 9 weight percent 1-octene and has a melt index of 6.0 dg/min. and a density of 0.919 g/cc. The polymer melt temperature is 130° to 140° C. This polymer mixture is pelletised to give a masterbatch. Granules of the masterbatch are tumble-blended with granules of the ethylene/1-octene copolymer stated above at the weight ratio of masterbatch to ethylene/1-octene copolymer of 1 to 9 (the resulting concentration of the antifogging agent in the ethylene/1-octene copolymer is 6000 ppm). A film of about 15 micrometers thickness is produced on a flat die cast film line at a melt temperature of about 230° C.

COMPARATIVE EXAMPLE C

A film is produced with the same ethylene/1-octene copolymer and under the same conditions as Example 1, however, without addition of an antifogging agent.

EXAMPLE 3

In the same way as described for Example 1, a mixture of 6000 ppm of the antifogging agent of Example 1 and an ethylene/1-octene copolymer having a melt index of 1.0 dg/min. and a density of 0.920 g/cc is prepared. The content of the 1-octene is the same as in Example 1. The amount of the antifogging agent is based on the ethylene/1-octene polymer weight. The mixture is fabricated into a film on a tubular blown film line at a melt temperature of 230° C. The thickness of the blown film is about 20 micrometers.

ANTIFOGGING TEST METHOD

This method tests the ability of the film surface to retain its antifogging agent even after abrasion, simulating abrasion of a food wrapping film by contact with the food surface. A paper towel dampened with hot water is placed in a plastic cup and a sample of film produced according to Example 1, 2 or 3 or Comparative Example A, B or C is stretched over the top of the cup and fixed in place. The cup is inverted and shaken so that the paper towel and water abrades and washes the surface of the film for 10 sec. The cup is placed the right way up in a refrigerator and inspected at intervals to evaluate the fogging of the film. The fogging is rated as follows:
High fogging: 5
Moderate fogging: 4
Fogged in patches: 3
Few large drops: 2
Clear, no drops: 1

| | ANTIFOGGING RATING/TIME | | | | | |
| --- | --- | --- | --- | --- | --- | --- |
| | 20 min | 40 min | 1½ hrs | 3½ hrs | 4½ hrs | 20 hrs |
| Example | | | | | | |
| 1 | 2 | 2 | 2 | 2 | 2 | 1 |
| 2 | 5 | 5 | 5 | 3 | 3 | 2 |
| 3 | 5 | 4 | 3 | 2 | 1 | 1 |
| Comparative Examples | | | | | | |
| A | 5 | 5 | 5 | 5 | 5 | 4 |
| B | 5 | 5 | 5 | 5 | 5 | 4 |
| C | 5 | 5 | 5 | 5 | 5 | 5 |

Examples 1 to 3 show that the time period after which the effect of the antifogging agent in the film is noticable is sufficiently short. The films produced according to Comparative Example A and B show some improvement over the film produced according to Comparative Example C, however, this improvement is insufficient for many applications.

What is claimed is:

1. A film-forming composition comprising a mixture of
(a) a linear low density polyethylene produced by polymerization of ethylene with up to about 25 percent by weight of the polymer of at least one alpha,beta-ethylenically unsaturated alkene having from 3 to 12 carbon atoms per alkene molecule and
(b) an antifogging agent, containing a compound of formula I

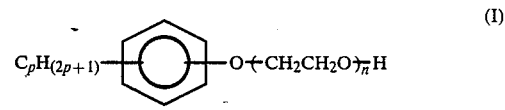

wherein n is an average number of 4 to 6 and p is 9 or 10.

2. The film-forming composition of claim 1 wherein the linear low density polyethylene has been produced by polymerisation of ethylene with up to about 25 percent 1-octene, 1-hexene, 4-methyl-1-pentene, 1-butene, propylene or a blend thereof, based on the total polymer weight, said polymer having a density of about 0.89 to about 0.94 g/ccm.

3. The film-forming composition of claim 1 wherein the linear low density polyethylene has been produced by polymerisation of ethylene with up to about 25 percent 1-octene, based on the total polymer weight, said polymer having a density of about 0.89 to about 0.94 g/ccm.

4. The film-forming composition of claim 1 wherein the amount of the alpha,beta-ethylenically unsaturated alkene having from 3 to 12 carbon atoms per alkene molecule is from about 5 to about 20 percent by weight of the polymer.

5. The film-forming composition of claim 1 wherein the compound of formula I is para-substituted.

6. The film-forming composition of claim 1 containing from about 0.4 to about 0.8 percent of the compound of formula I, based on the total weight of the ethylene polymer.

7. A film produced from a film-forming composition comprising a mixture of
(a) a linear low density polyethylene produced by polymerization of ethylene with up to about 25 percent by weight of the polymer of at least one alpha,beta-ethylenically unsaturated alkene having from 3 to 12 carbon atoms per alkene molecule and
(b) an antifogging agent, containing a compound of formula I

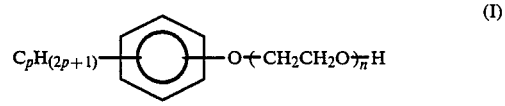

wherein n is an average number of 4 to 6 and p is 9 or 10.

8. The film of claim 7 wherein the linear low density polyethylene has been produced by polymerisation of ethylene with up to about 25 percent 1-octene, 1-hexene, 4-methyl-1-pentene, 1-butene, propylene or a blend thereof, based on the total polymer weight, said polymer having a density of about 0.89 to about 0.94 g/ccm.

9. The film of claim 7 wherein the linear low density polyethylene has been produced by polymerisation of ethylene with up to about 25 percent 1-octene, based on the total polymer weight, said polymer having a density of about 0.89 to about 0.94 g/ccm.

10. The film of claim 7 wherein the amount of the alpha, beta-ethylenically unsaturated alkene having from 3 to 12 carbon atoms per alkene molecule is from about 5 to about 20 percent by weight of the polymer.

11. The film of claim 7 wherein the compound of formula I is para-substituted.

12. The film of claim 7 containing from about 0.4 to about 0.8 percent of the compound of formula I, based on the total weight of the ethylene polymer.

13. The film of claim 7 which has not been subjected to a radiation treatment.

* * * * *

UNITED STATES PATENT AND TRADEMARK OFFICE
CERTIFICATE OF CORRECTION

PATENT NO. : 4,835,194

DATED : May 30, 1989

INVENTOR(S) : Paul F. Bright, et al.,

It is certified that error appears in the above-identified patent and that said Letters Patent is hereby corrected as shown below:

Column 2, Line 33; change "De-A-2007219" to --DE-A-2007219--.

Column 2, Line 33; change "comprises" to --comprising--.

Column 3, Line 9; change "ethlene" to --ethylene--.

Column 3, Line 19; change "copolymer" to --copolymers--.

Column 4, Line 14; change "cmbination" to --combination--.

Signed and Sealed this

Eleventh Day of September, 1990

Attest:

HARRY F. MANBECK, JR.

*Attesting Officer*     *Commissioner of Patents and Trademarks*